(12) United States Patent
Ramanathan et al.

(10) Patent No.: US 8,027,289 B2
(45) Date of Patent: Sep. 27, 2011

(54) ULTRA-LOW LATENCY PACKET TRANSPORT IN AD HOC NETWORKS

(75) Inventors: Subramanian Ramanathan, Concord, MA (US); Marcos A. Bergamo, Wellesley, MA (US); Brig B. Elliott, Arlington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 821 days.

(21) Appl. No.: 11/115,637

(22) Filed: Apr. 27, 2005

(65) Prior Publication Data

US 2006/0245424 A1 Nov. 2, 2006

(51) Int. Cl.
*H04W 4/00* (2009.01)
*H04B 7/216* (2006.01)
*H04L 12/66* (2006.01)
*H04L 12/28* (2006.01)

(52) U.S. Cl. ........ 370/328; 370/335; 370/353; 370/389; 370/392

(58) Field of Classification Search .................. 370/254, 370/328, 335, 342, 353–356, 389, 392
See application file for complete search history.

(56) References Cited

U.S. PATENT DOCUMENTS

| | | | |
|---|---|---|---|
| 6,151,636 A | 11/2000 | Schuster et al. | |
| 6,611,519 B1 * | 8/2003 | Howe | 370/386 |
| 7,068,624 B1 * | 6/2006 | Dantu et al. | 370/331 |
| 7,133,364 B2 | 11/2006 | Park | |
| 7,248,841 B2 * | 7/2007 | Agee et al. | 455/101 |
| 7,257,095 B2 * | 8/2007 | Liu | 370/311 |
| 2002/0114301 A1 * | 8/2002 | Yee et al. | 370/338 |
| 2002/0122395 A1 * | 9/2002 | Bourlas et al. | 370/329 |
| 2002/0196811 A1 * | 12/2002 | Park et al. | 370/474 |
| 2003/0152053 A1 * | 8/2003 | Evans et al. | 370/338 |
| 2003/0179742 A1 * | 9/2003 | Ogier et al. | 370/351 |
| 2004/0034713 A1 * | 2/2004 | Arita et al. | 709/236 |
| 2004/0162037 A1 * | 8/2004 | Shpak | 455/101 |
| 2004/0223491 A1 * | 11/2004 | Levy-Abegnoli et al. | 370/389 |
| 2004/0246931 A1 * | 12/2004 | Thubert et al. | 370/338 |
| 2005/0094637 A1 * | 5/2005 | Umesawa et al. | 370/389 |
| 2005/0094640 A1 * | 5/2005 | Howe | 370/395.1 |
| 2005/0169206 A1 * | 8/2005 | Nozaki | 370/316 |
| 2005/0249241 A1 * | 11/2005 | Farnsworth et al. | 370/469 |
| 2005/0254430 A1 * | 11/2005 | Clark et al. | 370/241 |
| 2006/0013211 A1 * | 1/2006 | Deerman et al. | 370/389 |
| 2006/0104232 A1 * | 5/2006 | Gidwani | 370/328 |

* cited by examiner

*Primary Examiner* — Huy Vu
*Assistant Examiner* — Brandon Renner
(74) *Attorney, Agent, or Firm* — Ropes & Gray LLP

(57) ABSTRACT

The systems and methods described herein include, among other things, processes for providing low latency packet transport in ad hoc networks. To this end, the systems, in certain embodiments, employ an architecture for communication nodes in MANETs, in which the delay introduced in "routing" or "relaying" the packet is reduced. In these systems invention, the data plane of the OSI stack at relay nodes is collapsed so that bits entering the node are re-energized "on-the-fly", with only a brief pause. A transit key in each packet, inserted by the originator of the packet, is used to index into a transit table to determine one of three actions to perform—drop, keep, or retransmit the packet. A control plane determines, for each packet, whether it should be re-energized or not. The control algorithm ensures that only nodes along the path from the source to the destination re-energize (relay) the packet.

34 Claims, 5 Drawing Sheets

Figure 1: Today's ad hoc networking imposes a lot of delay at each communications node.

PRIOR ART

Figure 2: Unlike the "store and forward" approach, our invention creates a single stream of energy, re-energized by intelligently selected relays

| | TRANSIT TABLE |
|---|---|
| KEY | ACTION |
| K1 | RELAY |
| K2 | RELAY |
| K3 | DROP |
| K4 | KEEP |

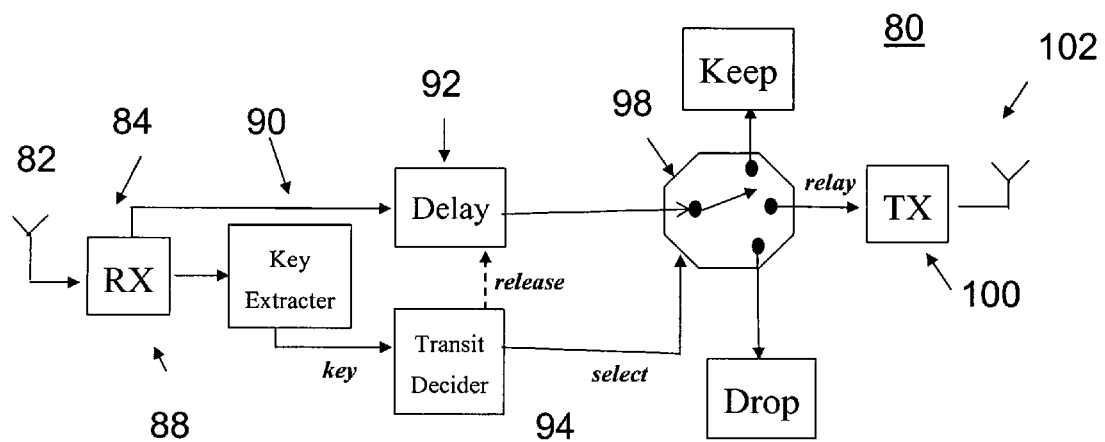
Figure 5: A high level depiction of physical layer functionality

ULTRA-LOW LATENCY PACKET TRANSPORT IN AD HOC NETWORKS

FIELD OF THE INVENTION

The systems and methods described herein relate, among other things, to devices and processes for routing data across an ad hoc network, including a wireless ad hoc network, in a manner that reduces latency of data packet transfer.

BACKGROUND

An ad hoc wireless network is one in which a packet may travel multiple wireless hops to reach its destination. It consists of a set of nodes or stations that autonomously discover each other, self-organize, and establish peer-to-peer communications without the presence of a centralized controller or fixed infrastructure. In the most common form of ad hoc networks, each node is potentially a wireless router of packets originated by itself or other nodes. Ad hoc wireless networks may be mobile or stationary. Other terms commonly used for multi-hop wireless networks include multihop networks, packet radio networks, and mesh networks, the last term is typically used only for stationary networks.

Ad hoc networks require different technology and algorithms from conventional wireless networks, e.g., cellular telephony systems. In cellular systems, the base stations provide network access to the handsets, which only need to go over one wireless "hop," rather than the multiple hops used in ad hoc networks. Furthermore, the base stations themselves do not move in cellular systems, so they can have very reliable, long-term interconnections such as point-to-point microwave or fiber links. In ad hoc networks, by contrast, there is no fixed infrastructure and, in the most general case, everything is moving.

Data communications in today's Mobile Ad hoc Networks (MANETs) is almost universally architected based on the layering concept. As shown in FIG. 1, at each relay node, a packet goes "up" three layers and then "down" three layers, with a number of processing and queueing steps along the way. Crucially, the packet has to re-contend for access to the shared channel at every single node along the way to the destination. This operational regime fundamentally limits the performance, chiefly the latency, and energy efficiency, of current ad hoc networks. These limitations on performance impact the quality of service provided by ad hoc networks and therefore limits their application as solutions for communication problems. Moreover, this regime creates a bottleneck that prevents technological advances in protocols and waveforms from translating into bottom-line end-to-end performance.

Latency has been a data communication issue for decades. Circuit switched communication networks have grappled with this problem for years, particularly in the context of providing the necessary quality of service needed for voice communications. Latency has also been a problem for packet switched networks. To address packet latency issues, scientists and engineers have developed cut through forwarding techniques that can reduce latency and increase quality. Similarly, wormhole routing techniques have been developed that reduce the processing needed to forward a data packet and therefore reduce latency. However, these techniques for wireline networks do not require the medium access arbitration that is required in a wireless ad hoc network. Moreover, wireline techniques do not need to decode wireless signals during the forwarding process and therefore avoid, at least largely, the latency delays arising from wireless signal processing.

Latency is a particularly severe problem for wireless ad hoc networks, because all the nodes in the network must contend for access to a shared RF medium. To date most wireless ad hoc networks have used a form of channel access protocol similar to that mandated by the IEEE 802.11 standard, in which a transmitting node first sends a Request to Send (RTS) signal, an intended receiving node then replies with a Clear to Send (CTS) signal if the transmission may proceed, and if so, the transmitting node then sends a data frame, followed up by an acknowledgement (ACK) from the receiving node if it was correctly received. This channel access protocol has numerous defects when used in an ad hoc network, e.g., the guard times needed for the transmission propagation may take a significant fraction of the time used for actual communication (or even more), multiple RTS/CTS interactions may need to take place before a data frame can actually be transmitted, and so forth. As a result, the delay for sending a single packet across multiple hops may be both variable and unacceptably high.

These problems exist in both stationary ad hoc networks and mobile ad hoc networks. In stationary ad hoc networks, channel access can be an issue because traffic patterns may change across the network as users transmit files, cease for a few minutes, then inspect web pages, etc. In short, bursty and unpredictable user traffic causes channel access issues for stationary ad hoc networks, which in turn causes unacceptably high delay (latency) for delivering such traffic. The problems are even worse in mobile ad hoc networks, where the hop-by-hop paths through the network change unpredictably even as these bursty traffic flows must be accommodated.

There therefore exists a need in the art for a transport process that provides reduced latency for a wireless ad hoc network.

SUMMARY OF THE INVENTION

The systems and methods described herein include, among other things, packet transport systems and devices that provide for reduced latency in an ad hoc network, as well as communications nodes, network systems, processes, and methods for manufacturing such nodes and networks. More particularly, the systems and methods described herein, in one aspect, include communications nodes for use in an ad hoc network that comprise a transit key processor for processing an incoming data packet to extract from that packet a transit key from a physical layer header of the data packet. The communications node further includes a transit decider that is responsive to the extracted transit key for controlling whether to forward the data packet across the ad hoc network. The transit decider may include a transit control table that stores information representative of transit keys that are expected to be seen on that ad hoc network and a forwarding action associated with each respective transit key. The stored forwarding action information provides information that the communications node can use for determining how to handle the data packet. The action selected will depend upon how the respective communications node relates to the path of the data packet through the ad hoc network. For example, if the respective communications node is the destination for that data packet, the communications node will keep the data packet and pass it up the stack. Alternatively, if the respective communications node is a node on the path from the source to the ultimate destination, however not the ultimate destination, the communications node will re-energize the data packet for immediate rebroadcast out to the ad hoc network. Further alternatively, if the respective communications node, upon examination of the data packet, determines that it is not the destination nor a node on the path from the source to the ultimate destination, no further processing is necessary and the packet may be dropped by that communications node and the communications node can return to monitoring incoming data packets and determining how to handle those incoming data packets.

More particularly, the systems and methods described herein include a communications node for use in an ad hoc network. The node may comprise a transit key processor for processing an incoming data packet to extract a transit key from a physical layer header of the data packet, and a transit decider responsive to the extracted transit key for controlling whether to forward the data packet across the ad hoc network. The transit decider may include a transit table that stores information representative of transit keys expected to be seen on the ad hoc network and a forwarding action actions associated with each those respective transit keys. The transit table generator may be capable of generating the transit control table as a function of a network topology of the ad hoc network. To this end, the transit table generator may include a link-state processor, and/or a distance-vector processor for generating a topology database storing nodes in the network and relationship data representative of a node's neighborhood relationship to another node. In other embodiments the system may include a gradient-flow processor for generating a gradient database storing nodes in the network and relationship data representative of a node's neighborhood relationship to another node, or optionally a sink-tree generator for generating a sink tree rooted at a destination for a source-destination pair in the network. The tables generator may be updated by an update processor for updating the transit table in response to a change in network topology.

The systems and methods described herein may operate with a wireless ad hoc network, a mobile wireless ad hoc network, an ad hoc sensor network, or any suitable network. The transmissions may be RF, optical, acoustic, magnetic or combinations thereof. The systems may be realized as devices, such as communication nodes, networks, chip sets, software systems, and consumer devices having these systems embedded therein. These systems and methods will be understood more fully from the following description and figures.

BRIEF DESCRIPTION OF THE FIGURES

The foregoing and other objects and advantages of the invention will be appreciated more fully from the following further description thereof, with reference to the accompanying drawings, wherein like reference numbers unless otherwise indicated refer to like elements.

FIG. 5 depicts a block diagram of one circuit for extracting a copy of a transit key from a physical layer header such as the physical layer header depicted in FIG. 4;

DETAILED DESCRIPTION

The systems and methods described herein include, among other things, processes for providing low latency packet transport in ad hoc networks. To this end, the systems, in certain embodiments, employ an architecture for communication nodes in ad hoc networks, in which the delay introduced in "routing" or "relaying" the packet is reduced. In these systems invention, the data plane of the OSI stack at communications nodes is collapsed so that bits entering the node are re-energized "on-the-fly", with only a brief pause. A control plane determines, for each packet, whether it should be re-energized or not. The control algorithm ensures that only nodes along the path from the source to the destination re-energize (relay) the packet. In these systems and methods, relaying is allowed to happen without changing the contents of the packet at each relay. This, along with the elimination of most of the processing and queueing and access delays, will result in very-low near-zero end-to-end latency in a scalable manner.

Figure 2:
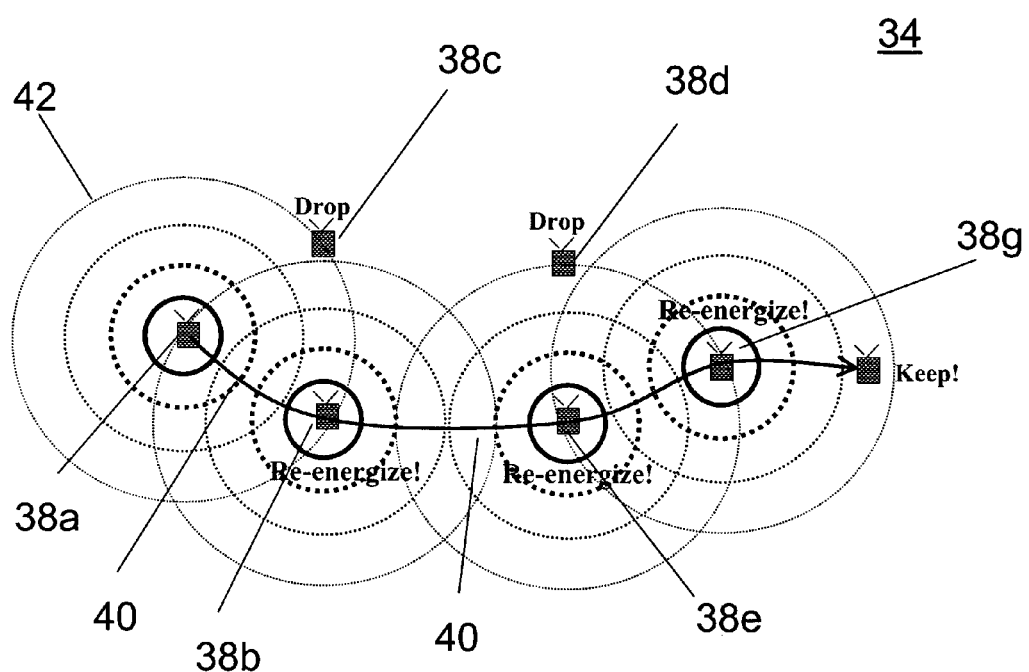
FIG. 2 depicts a wireless ad hoc network according to the invention.

FIG. 2 depicts one example of an ad hoc network of the type described herein. More particularly, FIG. 2 depicts an ad hoc network 34 having a series of nodes 38a-38g. FIG. 2 depicts a data packet being forwarded along the links of the path 40 that connects the source node 38a to the destination node 38g and that hops along some of the nodes 38a-38g as the packet traverses its path 40 through the network 34. FIG. 2 further depicts that certain nodes, such as nodes 38c and 38d, although in the network 34, are not within the path 40 of the data packet being forwarded along the links that interconnect source node 38a with destination node 38g. In the depicted embodiment, the ad hoc network is a wireless ad hoc network and this is shown pictorially by the circular lines 42 radiating from the communications nodes of 38, to show that the communications nodes broadcast to carry the data packets out to the nodes 38a-38g on the network 34, allowing the nodes to, as appropriate, forward the data packet to its destination.

In operation, from a high level point of view the network 34 depicted in FIG. 2 operates similarly to a conventional wireless ad hoc network. In those conventional networks, a control mechanism determines for each of the communications nodes 38a-38g the neighboring node that is on the path to the destination, typically called the "next-hop", for the data packet being moved by relay node. The data packet is moved from communications node to communications node by having each communications node act as a source that sends the packet to the next hop, which then determines its next hop within the ad hoc network. In wireless ad hoc networks, the wireless medium is a broadcast medium, as a field in the data packet indicates which neighboring node it is intended for, every communications node other than the communications node for which that packet is intended, drops that packet. This happens at every hop until the data packet reaches its destination. Thus, at each hop the packet is modified to remove the nodes address and insert the next hop address before retransmitting. Thus within the data plane, the relay node's of a conventional ad hoc network need to act, by operating on the data stored within the layers of the data packet being transmitted across the network.

Figure 1:
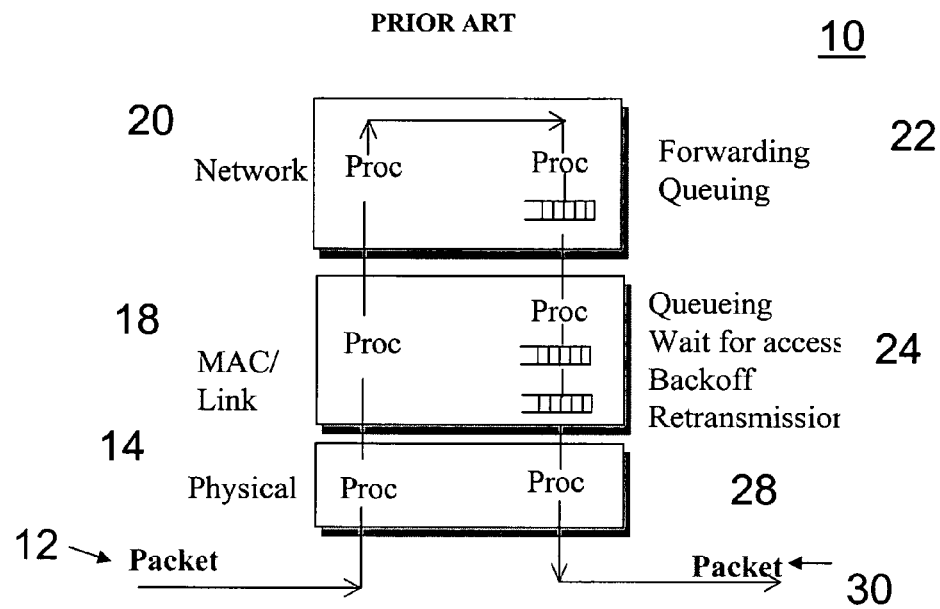
FIG. 1 depicts the prior art ad hoc networking stack.

Returning to FIG. 1, the prior art communications nodes implement the layer processing operations depicted by the stack 10 shown FIG. 1. Specifically, FIG. 1 shows a data packet 12 enters the physical layer 14 and is processed at the physical layer so that data can be handed up to the medium access control/link layer 18. After this layer, the data packet 12 is forwarded to the network layer 20 where it is placed in a forwarding queue 22 of the network layer 20. The queuing operation waits for access on the outgoing queue 24 of the MAC link layer 18 and when access is available, the outgoing side 28 of the physical layer 14 retransmits the data packet 12 with a modified header that includes a data field representative of the destination of the next hop to which the packet is to be forwarded. Thus, existing multi-hop wireless networks use the concept of layering and nested headers to send a packet from a source to its destination. Typically, the data, or payload information is encapsulated within four headers—transport layer header, network layer header, link layer header, and the physical layer header (which might also include the "preamble"). As the packet is relayed from one node to the next, the physical, link, and network layer headers are detached and re-attached, possibly with new information in the header, to guide the packet on the right path toward the destination. At the final destination, the transport layer header is also detached and the data or payload is handed to the application. Accordingly, in the prior art network, each relay node needs to listen for a packet, receive the packet, process the headers carried in the packet to determine whether that relay node should keep, retransmit or drop that packet, and based on that processing take an action that can involve remodulating the data packet for retransmission out to the network. The processing steps will take time and will add to the latency of the data packet as it is transmitted across the ad hoc network.

To address this issue, the network 34 depicted in FIG. 2 employs a cut-through or wormhole routing for ad hoc networks. Specifically, it employs a method for layering and header encapsulation, including a modification to the physical layer header to include traditional network layer information. It may further employ a method of forwarding where each node's action is reduced to one of three choices based on packet information that is invariant during the entire path—to keep the packet, to discard the packet, or to re-energize the packet. Further, the systems may employ a method for determining forwarding/re-energizing action at a node based on header fields that are invariant during the entire path. In other words, the packet does not have to be modified in transit. Further, the systems may employ a method for packet handling at the physical layer in which the packet experiences a reduced, and in some cases, near-zero delay in transit through a relay.

Figure 3:
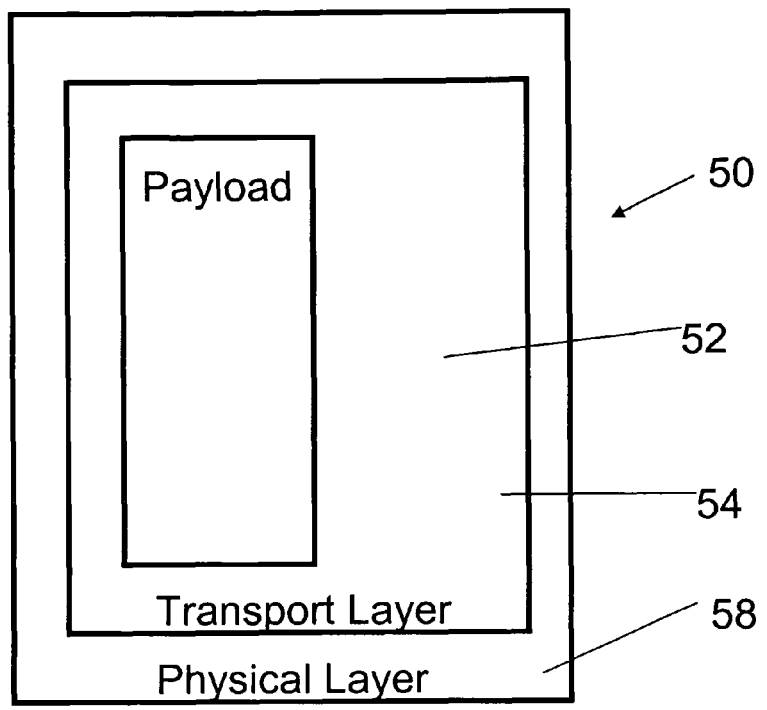
FIG. 3 depicts schematically a data packet for use with the network depicted in FIG. 2.

In one aspect, the systems and methods described herein are understood to eliminate the network and link layer headers and thereby resulting in a collapse of the "layering". That is, the payload is wrapped in a transport layer header and then directly within the physical layer header. The transport header is unchanged and might be the TCP, UDP, RTP headers or any other suitable header, if one is used at all, and contains the source and destination information, and possibly information for flow and reliability control as well. The physical layer header is modified, and contains a transit key. The transit key is used by each communications node to determine the action it should take upon receiving the packet. FIG. 3 depicts pictorially such a data packet, which could be used with the ad hoc network depicted in FIG. 2 to provide for low latency or reduced latency transfer across the ad hoc network 34.

More particularly, FIG. 3 depicts that the data packet 50 includes a payload 52 that is encapsulated within a transport layer 54. The payload 52 can be a conventional payload carrying data of any kind, including voice-over-ip data, conventional computer data, or any other kind of data that can be transferred over a data network. The payload 52 is encapsulated within a transport layer header 54 which maybe a TCP, UDP, RTP or any other kind of layer headers that contains information about the source and the destination for the data packet and possibly information for flow and reliability controls as well. FIG. 3 also depicts that a physical layer header 58 may encapsulate the transport layer header and the payload, and in this case, the physical layer header 58 is modified to include a transit key. In one embodiment, this transit key is used by each communications node to determine the action that node is to take when handling that packet. Thus, the physical layer header of the data packet layer shown in FIG. 3 is modified to include within it data that can be used at the physical layer processing to determine whether to forward a packet on, keep it or drop it. As such the physical layer includes the information needed by the communications node to determine its next action. This shortcuts the need to process the data packet through the stack 10 depicted in FIG. 1, and in turn reduces latency within the ad hoc network 34.

The transit key provides information for allowing the communications nodes to process the data packet at the physical layer and at the physical layer make a decision as to whether to forward, keep or drop a packet. The transit key may contain the communications-node address and the destination address. In this case, each communications node would insert a new address when it retransmitted the packet. The relay-node address could be used in two ways:
 a. The sending node inserts the address of the next-hop node on the path. Only the node with this address will retransmit the packet, the others will ignore it. This is similar to the way forwarding is done conventionally, except that in the present systems, this is done using a lookup table in the physical layer.
 b. The sending node inserts its own address. Only nodes that have the sending node as their child in the sink-tree for the destination re-energize the packet.

Further, the transit key may be the source and end-destination address. Only nodes that are on the path from the source to destination in the sink-tree rooted at the destination re-energize the packet. Further optionally, the transit key may be a label that identifies a flow (a "virtual circuit") that has been set up before using a signaling packet. There exist techniques to do this in ad hoc networks, see S. Ramanathan, M. Steenstrup, "Hierarchically-organized, Multihop Mobile Networks for Multimedia Support," *ACM/Baltzer Mobile Networks and Applications*, Vol. 3, No. 1, pp. 101-119 for example.

It is noted that in the above approaches, the first suggested approaches require changing the transit key before re-energizing. The other approaches do not require this. In the virtual circuit practice, however, there is a need to use a "set up" packet. Any of these approaches could be used by the systems and methods described herein, however, for the purpose of clarity and brevity, the use of a transit key that comprises the source and end-destination address, will be described throughout the rest of this disclosure. Thus, although the transit key shall be described mostly in the below examples as the source destination pair, it must be remembered, however, that it could also be the label.

Thus, a label, a source-destination pair or some other information may be employed by the systems and methods described herein to provide a transit key that the system processes at the physical layer and employs for forwarding data over the network 34. The transit key provides a waveform characteristic that the system may detect and employ to route data packets. The waveform characteristic may be detected at the physical layer 14, and at the physical layer a forwarding decision can be made. Thus, the waveform characteristic may be a bitstream or some other waveform that can be recognized at the physical layer. Other ways of adjusting or modulating the data packet may be employed and the actual technique used to encode the transit key within the waveform will vary according to the application at hand and the design criteria involved.

As discussed above, the systems and methods described herein include embodiments where a virtual circuit is established. In one such embodiment, a setup packet is forwarded through the Network 34 traveling across different nodes 38a-38g in the path 40. The system detects the setup packet, and nodes on the path of the set up packet establish within the transit table forwarding information for data packets having a label associated with the virtual circuit. The label, as described above, may present itself as a characteristic of the waveform that may be detected at the physical layer. In one embodiment, the label is detected and kept by the communication node. The communication node passes the kept data packet up through the stack and reads the data contained in the data packet. In this embodiment, the data packet contains a control word that directs the communication node to adjust the transit table to include an entry to be associated with a particular label. For example, in one embodiment a communication node on the network may act as a data source. The data source node may be a sensor or other device application or system that generates data packets for transfer over the network. To establish a virtual circuit for transferring multiple data packets over the network between the data source and the sink that will receive the data packets, the data source generates a data packet that can establish the virtual circuit across the network. The technique employed for setting up a virtual circuit will depend upon the application and the characteristics of the network. One suitable technique for setting up a virtual circuit is described in Ramanathan et al. "Hierarchically—Organized, Multimedia Support", ACM/Baltzer Mobile Networks and Applications, Vol. 3, No. 1 pp 101-119, the contents of which are incorporated by reference herein. Once the virtual circuit is set up, the data source node may generate data packets having as a transit key, the label associated with the circuit. This transit key can direct each communication node on the network to relay the data packets as necessary, until the data packet reaches the data sink node. Optionally, once the transmission of data from the data source is complete, the data source node may send a "teardown" packet that tears down the virtual circuit by removing from the transit tables, the label associated with the virtual circuit being removed.

Thus, assuming the transit key provides information representative of a source and end-destination, then the source node in the network 34, which may include a gateway onto the network 34, inserts the transit key into the header of the physical layer and the inserted transit key is left unchanged by the other nodes in the network 34. The number of bits used for the transit key varies according to the application as well as the size of the network. Optionally, a special transit key value may be established that denotes that all nodes receiving this packet are destinations. This is useful for broadcast packets, such as network control packets. One possible manifestation of the physical layer header with this addition shown in FIG. 4 and is based on the 802.11 physical layer header (known as the PLCP). That is, if the systems described herein, including ad hoc network nodes, gateways and other devices, were to be developed as an enchancement of the 802.11 physical layer, (in order to leverage the chipset manufacturing base, for instance), the header may look similar to the header depicted in FIG. 4, which includes a Sync field 60, a SFD field 62, a transit key field 64, a Signal field 68, a Service field 70, a length field 72, a CRC field 74 and a payload 76.

Figures 4, 6:
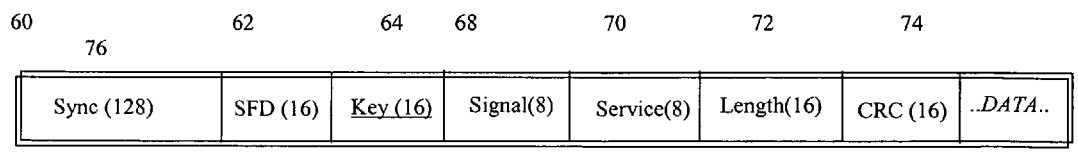
FIG. 4 depicts an example of a physical layer header for use with the packet depicted in FIG. 3.
FIG. 6 depicts one example of a transit control table.

The only new field in the header shown in FIG. 4 is the transit key field (Key) 64 inserted in the front of the header. A 16 bit key will support at least a 256 node ad hoc network (8 bits for source and 8 bits for destination), and potentially a larger network if a suitable compression technique were used. The value of 16 bits is given for an exemplary instantiation only—the systems and methods described herein do not restrict the number of bits used for the key. The semantics and usage of the other fields in the depcited header remain the same as in 802.11. Information about these fields will be known to those of skill in the art and will be discussed in the literature including M. S. Gast, "802.11 Wireless Networks: The Definitive Guide" O'Reilly Networking Series. Further, it will be understood that 802.11 describes one type or class of communication systems and that the physical layer header of any communications system may be similarly modified to incorporate a transit key field.

Once the communications node that is the source for the data packet has encapsulated the data packet with the transit key, the communications node may broadcast the data packet to the network 34, and the other nodes can process the data packet responsive to the transit key contained in the physical layer header. In one practice, the communications nodes forward the data packets on by selectively re-energizing data packets.

Conventional relaying of packets from source to destination involves a functionality commonly known as "forwarding", which works as follows. Each packet contains the address of the destination node in its network layer header. Each node contains a lookup table called the forwarding table that contains, for each destination node, the address of the next-hop neighboring node to which the packet must be relayed. When a packet arrives at a node, the destination address is extracted and looked up in the forwarding table for the next-hop. The packet is then sent to the next hop node. In ad hoc networks, the packet is broadcast with the next-hop node's address in the link-layer header of the packet. All except the next-hop node whose address matches the address in the packet ignore the packet. The next-hop node then repeats the process until the packet reaches the destination. Note that each node needs to change the header of the packet at each hop to insert the next-hop node's address.

The systems and methods described herein use a method of selective re-energization to forward data packets along the network. As discussed above, each packet physical layer header contains the source and destination, the transit key 64. The communications node employs the transit key 64 as follows. Each communications node 38a-38g contains a transit control table which maps a given transit key value to one of three operations: keep, retransmit, drop. When a packet arrives at a communications node 38a-38g, the transit key 64 is extracted and looked up in the transit control table, and the operation is obtained. If the operation is keep, then the packet is delivered to the transport layer. If the operation is retransmit, the packet is re-energized, and if it is drop, the packet is ignored.

The concept of operations is illustrated in FIG. 2. The source node transmits the packet. Relay nodes not on the path from the source to destination, as deemed by a control algorithm described below, drop the packet. One node re-energizes it. This is repeated until the packet reaches the destination which keeps the packet. Having both the source and destination in the physical layer header allows any node that receives the packet to determine whether or not it should re-energize, drop or keep, as described below.

Unlike the forwarding table, the transit control is done at the physical layer, and possibly in hardware, for instance using FPGAs. Furthermore, unlike conventional forwarding, there is no need to change the header from hop to hop since our key is based on source and destination which are invariant.

In one practice, the communications nodes of the invention relay the packets "on-the-fly", without storing, header encapsulation/decapsulation, queueing, or contention. FIG. 5 depicts one embodiment of a signal processing circuit capable of processing the data in the physical layer headers on the fly to determine the transit key 64 and respond to that key, all while in the physical layer. More particularly, FIG. 5 depicts a circuit 80 that includes an antenna, or signal input 82, a receiver 84, and converter 88, a field extractor circuit 90, a delay line or circuit 92, a transit decider circuit 94, a switch 98, an energizer 100 and a converter 102.

The data packet is first received by the communications node at the antenna 82 and receiver 84 and converted into digital mode as is typical in today's transceivers. This converter includes synchronization, acquisition, demodulation, and optionally, descrambling and decoding functionalities. The packet bit stream then passes through a key extractor circuit 90 that recognizes and duplicates the source-destination transit key string 64 in the physical layer header 58 and routes it to a transit decider 94. The packet bit stream enters a delay line or circuit 92 which delays the bit stream sufficiently to enable the transit decider 94 to perform the lookup function.

In one embodiment, the transit decider circuit 94 contains a lookup table—called the transit table—that maps each possible key to one of keep/re-energize/drop actions. The transit decider circuit 94 uses the transit key 64 from the incoming packet and determines the action from the transit table, and sends a signal to the switch circuit 98 that modifies its setting based on the signal to one of three outgoing paths as shown in the figure.

If the switch 98 gets set to "re-energize", the bit stream passes through the switch and then is converted at converter 102 into analog mode and transmitted. The TX box 102 may include necessary modulation, scrambling and other functionalities. If the switch 98 gets set to "keep", the packet is routed to a buffer that is delivered to the end-to-end transport control entity (e.g. TCP or UDP) after removing the physical layer header. If the switch 98 gets set to "drop", the packet is silently discarded.

The keyextractor circuit 90 extracts a given field from an incoming packet and diverts it to a module. If not already available in current art, a key extracter circuit 90 may be constructed as follows for the header illustrated in FIG. 4. After recognizing the preamble, a controller counts for 16 bits (to let the SFD 62 go by). At the end of 16 bits, a switch is set to a different point so that all coming bits are duplicated and diverted. After the controller counts another 16 bits (the transit key 64), the switch is reset to turn this off. If triggering on bit count is difficult, special start and end of field delimiters with well known rare sequences may be used to set/reset the switch.

The transit decider circuit 94 may be constructed from a flexible hardware component, such as a FPGA. The lookup table may be determined by a distributed algorithm, such as the one described below and may be loaded into the FPGA memory periodically and upon a change. A simple hardware lookup would take less than a microsecond, and therefore the delay due to the delay circuit is very small.

If the packet length is such that the total delay within the node is less than the reception time, then the transmission would start before the reception ends. In case the communications node is used within a system that allows simultaneous transmission and reception (e.g. multiple frequency system where the transmit frequency is different from the receive frequency), this is not a problem, otherwise, the delay circuit 92 should have a delay that is the larger of the reception time of the packet and the transit table lookup delay.

The communications nodes 38*a*-38*g* employ certain control mechanisms to support the above described data path. In particular, there is a mechanism by which the transit (lookup) table is created and updated in the transit decider circuit 94. The control mechanism creates and maintains in response to topological changes a transit table in each communications node 38*a*-38*g* so that packets are routed correctly from source to destination. In particular, given a representation of the network topology, and given the source and destination of a packet, the mechanism determines whether "this" node (i.e., the node on which the mechanism is running), should re-energize, drop or keep the incoming packet. The set of such determinations for each source-destination pair (or transit key) forms the transit table that is loaded into the transit decider circuit 94. In one embodiment, the control mechanism employs a dynamic transit table computation mechanism. It may consist of two parts, a first part that employs existing techniques for creating and maintaining a topology database; and a second part for computing the transit table from the topology database.

One well-known network routing protocol is the link-state protocol. This protocol is used for creating a topology database that stores information representative of the network topology for the ad hoc network, such as the network 34. The topology database contains the set of nodes in the network 34 and their neighborhood relationships, both of which may change over time. As a result of the execution of the link state protocol, the entire network topology is available at each node in the network. This network topology database may be thought of as being equivalent to a graph with vertices representing the nodes and the edges representing the neighbor relationship. Changes in the neighbor relationship (i.e., the topology of the network) are reflected by updating the topology database by disseminating link state updates.

Typically, the topology database is used by a communications node in a conventional ad hoc network as follows. Each communications node calculates the shortest path from itself to every other communications node in the network, typically using a shortest-path first algorithm such as Dijkstra's algorithm. Given an incoming packet, the communications node extracts the destination, and determines the next hop neighbor N that is on the shortest path to the destination. It then modifies the header of the packet to include address of N and broadcasts it. All communications nodes except N discard the packet. Node N repeats the procedure.

With the systems and methods described herein, the topology database is built as before, but employed and applied differently. Specifically, a communications node runs an algorithm to create a sink tree for every communications node Z in the network (except itself) with Z being the root of the sink tree. The tree establishes a parent-child relationship amongst nodes in the network—in particular, for every node, the parent of the node is determined (clearly, in a tree, each node has only one parent). Establishment of the sink tree may be done by executing Dijkstra shortest path algorithm M−1 times, where M is the number of nodes in the network. The cost of each link (edge) may be taken as 1—i.e., the minimum number of hops is the optimization criterion. Then, for a given source destination pair S, D, a communications node X determines the entry for S-D as follows:

1. If X equals D, the entry is "keep"
2. Otherwise, if X is on the path from S to D in the sink tree rooted at D (that is, if X is the ancestor of S in the sink tree), then the entry is "re-energize". Note that for a shortest-hop tree, X is uniquely determined, that is, there is only one such node that satisfies the conditions. Thus, only one node will re-energize.
3. Otherwise, the entry is to be dropped.

This is done for each source-destination pair in the network, or for a relevant portion of these pairs. The set of entries thus determined constitutes the transit table. The transit table is updated each time the topology database changes. Incremental version of this algorithm may be used, and thus it is not necessary to start computation from scratch each time the topology database changes.

The preceding descriptions have discussed how relaying may be accomplished by communications nodes. In some implementations, certain of the communications nodes may be designed so that they do not act as relay. For example, some communications nodes may be "data sources," e.g., those nodes used for sensing the environment and reporting their sensed measurements. Other communications nodes may be "data sinks," e.g., those connected to actuators, devices with very limited battery power, etc. For these and other reasons, therefore, it may be desirable to build systems in which some, but not all, of the communications nodes act as relays. This invention is directly applicable to these situations as well, as the "data source" nodes would provide enough functionality to be able to launch a packet towards its intended destination, and the "data sink" nodes would be able to participate in receiving packets relayed by other communication nodes. It should be clear, however, that these "data source" and "data sink" nodes in such systems may not provide the full relay functionality as described above.

In addition, the systems and methods described herein may be employed in communications nodes with a variety of antenna forms. For example, it may be employed with omni-directional antennas, patch antennas, directional antennas, phased-array antennas, steerable antennas, and so forth. Additionally, it may be employed for a wide range of electromagnetic frequencies, including VHF, UHF, L-band, microwave bands, terahertz bands, and optical bands. It may further be employed for communications through other media, such as acoustic or magnetic communications.

The systems and methods described herein may be implemented in software, electronics hardware, or firmware, or a combination thereof. As discussed above, these low latency transport systems may be realized, at least in part, as software components operating on a data processing system. The data processing platform may be any suitable platform, such as a single board computer, microcontroller board, in some applications, a Unix workstation, or any other suitable device. In that embodiment, the transport system may be implemented as a C language computer program, or a computer program written in any high level language including C++, Fortran, Java or Basic. Additionally, in an embodiment where microcontrollers or DSPs are employed, the transport system may be realized as a computer program written in microcode or written in a high level language and compiled down to microcode that can be executed on the platform employed. The development of such data processing systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing (1983). It is noted that DSPs are particularly suited for implementing signal processing functions, including preprocessing functions such as signal demodulation and enhancement. Developing code for the DSP and microcontroller systems follows from principles well known in the art. Accordingly, although FIG. 5 graphically depicts a transport system as a collection of functional block elements, it will be apparent to one of ordinary skill in the art that these elements can be realized as computer programs or portions of computer programs that are capable of running on the data processor platform to thereby configure the data processor as a system according to the invention. However, other elements and blocks within the figure may be realized as circuit components and devices, with the choice of elements falling within the discretion of the user.

Those skilled in the art will know or be able to ascertain using no more than routine experimentation, many equivalents to the embodiments and practices described herein. It will also be understood that the systems described herein provide advantages over the prior art including the greater scalability of low latency transport systems and networks. The systems and methods described herein are applicable to both military and civilian data networks, in particular, in the context of real-time communications in ad hoc networks. Military application examples include call-for-fire, audio/video conferencing, real-time image analysis and action, and telemedicine in the battlefield. Civilian applications appear in the context of the burgeoning broadband wireless networks using a mesh architecture. Such applications include packetized video-on-demand, real-time voice over IP and video over IP.

Accordingly, it will be understood that the invention is not to be limited to the embodiments disclosed herein, but is to be understood from the following claims, which are to be interpreted as broadly as allowed under the law.

The invention claimed is:

1. A communications node for use in an ad hoc network, comprising
a transit key processor for processing an incoming data packet to extract a transit key from a physical layer header of the data packet, wherein the transit key comprises data that is indicative of an intended path of the data packet, and wherein the physical layer header encapsulates a transport layer header which further encapsulates a data payload;
a transit decider, within a physical layer of the node, responsive to the extracted transit key for controlling whether to forward the data packet across the ad hoc network, wherein the data packet is dropped if the node is not on the intended path; and
a data switch, within the physical layer, for forwarding the data packet in response to a signal from the transit decider, without processing the data packet using a link layer or network layer of the node.

2. A communications node according to claim 1, wherein the transit decider includes a transit table storing information representative of transit keys expected to be seen on the ad hoc network and forwarding actions associated with those transit keys.

3. A communications node according to claim 2, further comprising a transit table generator capable of generating the transit table as a function of a network topology of the ad hoc network.

4. A communications node according to claim 3, wherein the transit table generator includes a link-state processor for generating a topology database storing nodes in the network and relationship data representative of a node's neighborhood relationship to another node.

5. A communications node according to claim 3, wherein the transit table generator includes a distance-vector processor for generating a topology database storing nodes in the network and relationship data representative of a node's neighborhood relationship to another node.

6. A communications node according to claim 3, wherein the transit table generator includes a gradient-flow processor for generating a gradient database storing nodes in the network and relationship data representative of a node's neighborhood relationship to another node.

7. A communications node according to claim 2, wherein the transit table generator includes a sink-tree generator for generating a sink tree rooted at a destination for a source-destination pair in the network.

8. A communications node according to claim 7, further comprising an action generator for determining, as a function of a sink tree, an action for a respective node to take in response to a transit key.

9. A communications node according to claim 8, wherein the action generator processes a sink-tree to determine whether a respective node is on a sink-tree path associated with the transit key.

10. A communications node according to claim 3, wherein the table generator includes an update processor for updating the transit table in response to a change in network topology.

11. A communications node according to claim 1, wherein the ad hoc network comprises a wireless ad hoc network.

12. A communications node according to claim 11, wherein the wireless ad hoc network comprises a mobile wireless ad hoc network.

13. A communications node according to claim 11, wherein the wireless ad hoc network comprises an ad hoc sensor network.

14. A communication node according to claim 1, wherein the communication node is selected from the group consisting of a data sink node, a data relay node and a data source node.

15. A communication node according to claim 1, further comprising
an antenna for transmitting a data signal wherein the antenna is selected from the group consisting of an antenna for transmitting an electromagnetic signal, an antenna for transmitting an acoustic signal, an antenna for transmitting an optical signal, and an antenna for transmitting a magnetic signal.

16. A communications node according to claim 1,
wherein the data switch receives the incoming data packet on a first frequency and begins transmitting the data packet on a second frequency, while a remainder of the data packet is still being received.

17. A communications node according to claim 16 wherein the first frequency is different from the second frequency.

18. A communication node according to claim 1, wherein the transit key is associated with a source address and a destination address of the data packet.

19. A communication node according to claim 1, wherein the transit key remains unchanged during the re-energizing and forwarding across the network.

20. A communication node according to claim 1, wherein the data that is indicative of the intended path of the data packet comprises a destination.

21. A communication node according to claim 1, wherein the data that is indicative of the intended path of the data packet comprises a next-hop node.

22. A communications node for use in an ad hoc network, comprising:
a data packet generator for encapsulating a data payload, which is encapsulated within a transport layer header, within a physical layer header, the physical layer header having a transit key representative of information for forwarding the data packet through the ad hoc network;
a transit key processor, within a physical layer of the node, for processing an incoming data packet to extract the transit key from a physical layer header of the data packet, wherein the transit key comprises data that is indicative of an intended path of the data packet;
a transit decider, within the physical layer, responsive to the extracted transit key for controlling whether to forward the data packet across the ad hoc network, wherein the data packet is dropped if the node is not on the intended path; and
a data switch, within the physical layer, for forwarding the data packet in response to a signal from the transit decider, without processing the data packet using a link layer or network layer of the node.

23. A communication node according to claim 22, wherein the transit key is associated with a source address and a destination address of the data packet.

24. A communication node according to claim 22, wherein the data that is indicative of the intended path of the data packet comprises a destination.

25. A communication node according to claim 22, wherein the data that is indicative of the intended path of the data packet comprises a next-hop node.

26. A circuit system for use with a node in an ad hoc network, comprising
a transit key circuit for processing an incoming data packet to extract a transit key from a physical layer header of the data packet, wherein the transit key comprises data that is indicative of an intended path of the data packet, and wherein the physical layer header encapsulates a transport layer header which further encapsulates a data payload;
a transit decider circuit, within a physical layer of the node, responsive to the extracted transit key for controlling whether to forward the data packet across the ad hoc network, wherein the data packet is dropped if the node is not on the intended path; and
a data switch circuit, within the physical layer, for forwarding the data packet in response to a signal from the transit decider, without processing the data packet using a link layer or network layer of the node.

27. A circuit system according to claim 26, further comprising
a transit table generator circuit for generating a transit control table, whereby the transit decider is provided a transit table storing information representative of transit keys expected to be seen on the ad hoc network and a forwarding action associated with each those respective transit keys.

28. A circuit system according to claim 26, wherein the transit key is associated with a source address and a destination address of the data packet.

29. A communication node according to claim 26, wherein the data that is indicative of the intended path of the data packet comprises a destination.

30. A communication node according to claim 26, wherein the data that is indicative of the intended path of the data packet comprises a next-hop node.

31. A method for routing data packets across an ad hoc network, comprising
encapsulating a data payload, which is encapsulated within a transport layer header, within a physical layer header having a transit key representative of information for forwarding a data packet to a destination node, wherein the transit key comprises data that is indicative of an intended path of the data packet;
transmitting the encapsulated data packet to nodes on the network;
directing the nodes to extract a copy of the transit key from the physical layer header; and determining at a physical layer of the node to forward the data packet as a function of the extracted transit key, without processing the data packet using a link layer or network layer of the node, wherein the data packet is dropped if the node is not on the intended path.

32. A method according to claim 31, wherein the transit key is associated with a source address and a destination address of the data packet.

33. A non-transitory computer readable medium having stored thereon instructions for directing a computer system to implement a method, comprising the steps encapsulating a data payload, which is encapsulated within a transport layer header, within a physical layer header having a transit key representative of information for forwarding a data packet to a destination node, wherein the transit key comprises data that is indicative of an intended path of the data packet;

transmitting the encapsulated data packet to nodes on the network; directing the nodes to extract a copy of the transit key from the physical layer header; and determining at a physical layer of the node to forward the data packet as a function of the extracted transit key, without processing the data packet using a link layer or network layer of the node, wherein the data packet is dropped if the node is not on the intended path.

34. A computer-readable medium according to claim 33, wherein the transit key is associated with a source address and a destination address of the data packet.

* * * * *